United States Patent
Yoo et al.

(10) Patent No.: US 10,851,873 B2
(45) Date of Patent: Dec. 1, 2020

(54) TRANSMISSION FOR MOTOR

(71) Applicant: MBI CO., LTD., Cheongju-si (KR)

(72) Inventors: Hyuk Yoo, Cheongju-si (KR); Tae-Jin Jung, Cheongju-si (KR); Sung-Cheol An, Cheongju-si (KR); Moon-Soo Yoo, Seongnam-si (KR)

(73) Assignee: MBI CO., LTD., Cheongju-Si (KR)

( * ) Notice: Subject to any disclaimer, the term of this patent is extended or adjusted under 35 U.S.C. 154(b) by 435 days.

(21) Appl. No.: 15/748,290

(22) PCT Filed: Jun. 20, 2016

(86) PCT No.: PCT/KR2016/006504
§ 371 (c)(1),
(2) Date: Jan. 29, 2018

(87) PCT Pub. No.: WO2017/047911
PCT Pub. Date: Mar. 23, 2017

(65) Prior Publication Data
US 2018/0223957 A1    Aug. 9, 2018

(30) Foreign Application Priority Data

Sep. 15, 2015  (KR) .......................... 10-2015-0130523

(51) Int. Cl.
*F16H 3/10*    (2006.01)
*F16H 3/00*    (2006.01)
(Continued)

(52) U.S. Cl.
CPC ........... *F16H 3/003* (2013.01); *F16D 41/064* (2013.01); *F16D 41/067* (2013.01); *F16H 1/22* (2013.01);
(Continued)

(58) Field of Classification Search
CPC ... F16H 1/22; F16H 3/003; F16H 3/06; F16H 3/10; F16D 41/064; F16D 41/067
See application file for complete search history.

(56) References Cited

U.S. PATENT DOCUMENTS 7,389,863 B2 *   6/2008   Rubino .................. F16D 41/064
192/38

FOREIGN PATENT DOCUMENTS

| JP | 2009-79408 | * | 4/2009 |
| JP | 2009-281568 | | 12/2009 |

(Continued)

OTHER PUBLICATIONS

English translation of the Written Opinion of International Application No. PCT/KR2016/006504; dated Mar. 20, 2018.
(Continued)

*Primary Examiner* — William C Joyce
(74) *Attorney, Agent, or Firm* — LRK Patent Law Firm (57) ABSTRACT

A transmission for a motor is provided, which optimizes a transmission for outputting a rotational force only in one direction at different shifting ratios according to forward/reverse rotation directions of a rotational shaft of the motor while enabling a reverse input, accurately transmits the rotational force without slippage and has durability even upon use thereof for a long period of time, thereby improving reliability and shifting accuracy and maximizing marketability and market competitiveness.

2 Claims, 11 Drawing Sheets

(51) Int. Cl.
*F16D 41/067* (2006.01)
*F16H 1/22* (2006.01)
*H02K 7/116* (2006.01)
*F16D 41/064* (2006.01)
*F16H 3/06* (2006.01)
*F16D 41/06* (2006.01)

(52) U.S. Cl.
CPC ...... *H02K 7/116* (2013.01); *F16D 2041/0608* (2013.01); *F16H 3/06* (2013.01); *F16H 3/10* (2013.01)

(56) References Cited

FOREIGN PATENT DOCUMENTS

| | | |
|---|---|---|
| KR | 10-2009-0100820 | 9/2009 |
| KR | 10-2009-0115422 | 11/2009 |
| KR | 10-2013-0012821 | 2/2013 |
| KR | 10-2014-0022333 | 2/2014 |

OTHER PUBLICATIONS

International Search Report for International Application No. PCT/KR2016/006504, dated Sep. 22, 2016.

* cited by examiner

TRANSMISSION FOR MOTOR

TECHNICAL FIELD

The present invention relates to a transmission for a motor, and more particularly, to a transmission for a motor, which optimizes a transmission for outputting a rotational force only in one direction at different shifting ratios according to forward/reverse rotation directions of a rotational shaft of the motor while enabling a reverse input, accurately transmits the rotational force without slippage and has durability even upon use thereof for a long period of time, thereby improving reliability and shifting accuracy and maximizing marketability and market competitiveness.

BACKGROUND ART

Generally, a transmission is provided to improve the operating performance of overall industrial machinery or the driving performance of transportation equipment such as a bicycle, a wheelchair, an automobile, a scooter, a motorcycle, a ship or the like, which is provided with wheels and travels using various kinds of driving forces such as man power or an electromotive force.

Such a transmission performs shifting in response to manipulation of a rider or a user to obtain a torque or speed required under a driving condition.

Recently, a transmission in which a planet gear set consisting of a sun gear, planet gears, a ring gear and a carrier is provided in a hub shell to shift speeds at multiple ranges has been employed. However, there are technical problems in that this conventional transmission has a small number of shifting ranges in spite of its complicated structure, and particularly, a pawl that has been strongly restricted by a driving load when a shifting manipulation is being performed in a loaded driving travel state is not smoothly controlled, whereby the shifting is not smoothly performed.

A continuously variable transmission (CVT) has been developed as an alternative to a transmission using a planetary gear set having such a problem. Although the continuously variable transmission (CVT) can continuously and freely change shifting ratios without being bound by a predetermined shifting range, there are problems in that as compared with a conventional gear type transmission, the CVT is bulky and has a complicated structure, resulting in high manufacturing costs; in particular, durability is degraded when a large load is applied thereto since the rotational force should outputted through shifting based on a frictional force; and a power loss is likely to occur due to slippage between components, among other things.

Particularly, in recent years, as a bicycle, a scooter or the like that employs a motor as a drive source has been rapidly propagated, there is a need for a transmission having a compact and durable structure even if it has a small number of shifting ranges.

DISCLOSURE

Technical Problem

The present invention is conceived to solve the aforementioned problems and provides a transmission for a motor, which optimizes a transmission for outputting a rotational force only in one direction at different shifting ratios according to forward/reverse rotation directions of a rotational shaft of the motor while enabling a reverse input, accurately transmits the rotational force without slippage, thereby improving reliability and shifting accuracy for the transmission, and has durability even upon use thereof for a long period of time through symmetrically arranged helical gears, thereby maximizing marketability and market competitiveness of the transmission.

Technical Solution

The present invention is achieved by a transmission for a motor, wherein the transmission receives a rotational force from a rotational shaft of a motor to perform an output to an output shaft through shifting, and outputs the rotational force only in one direction at different shifting ratios according to forward/reverse rotation directions of the rotational shaft of the motor. The transmission includes a driving shaft having one or more one-way clutch contact surfaces formed on an outer periphery of a certain region of the driving shaft; a dual one-way clutch including a carrier for accommodating forward restrictors and reverse restrictors in both faces of the carrier, respectively, wherein the forward and reverse restrictors are radially equidistantly arranged with a predetermined phase angle difference, and a forward output ring and a reverse output ring disposed outside the forward restrictors and the reverse restrictors, respectively, to be selectively rotated according to a rotation direction of the driving shaft; and a low-speed rotational force transmitting means and a high-speed rotational force transmitting means including a plurality of gears engaged with one another, wherein the low-speed rotational force transmitting means and the high-speed rotational force transmitting means receive the rotational force independently from the forward output ring and the reverse output ring of the dual one-way clutch so as to rotate the output shaft with the shifting ratios though different paths. Accordingly, the dual one-way clutch allows a reverse input in a direction opposite to a rotation direction of an output of the output shaft.

Preferably, the carrier of the dual one-way clutch has a flange-shaped extension formed between the forward output ring and the reverse output ring, elastic bodies for elastically supporting balls toward the forward output ring and the reverse output ring are accommodated in the extension, and grooves are formed on the forward output ring and the reverse output ring, respectively, wherein each of the grooves corresponds to the ball and extends along an outer periphery of the corresponding output ring.

More preferably, the low-speed rotational force transmitting means and the high-speed rotational force transmitting means include a plurality of gear trains consist of helical gears arranged in opposite directions with respect to the dual one-way clutch, so that the helical gears are rotated while receiving symmetrical forces when the rotational forces are transmitted thereto.

Advantageous Effects

The transmission for a motor according to the present invention optimizes a transmission for outputting a rotational force only in one direction at different shifting ratios according to forward/reverse rotation directions of a rotational shaft of the motor while enabling a reverse input, accurately transmits the rotational force without slippage, thereby improving reliability and shifting accuracy for the transmission, and has durability even upon use thereof for a long period of time through symmetrically arranged helical gears, thereby maximizing marketability and market competitiveness of the transmission.

BEST MODE

Figure 1:
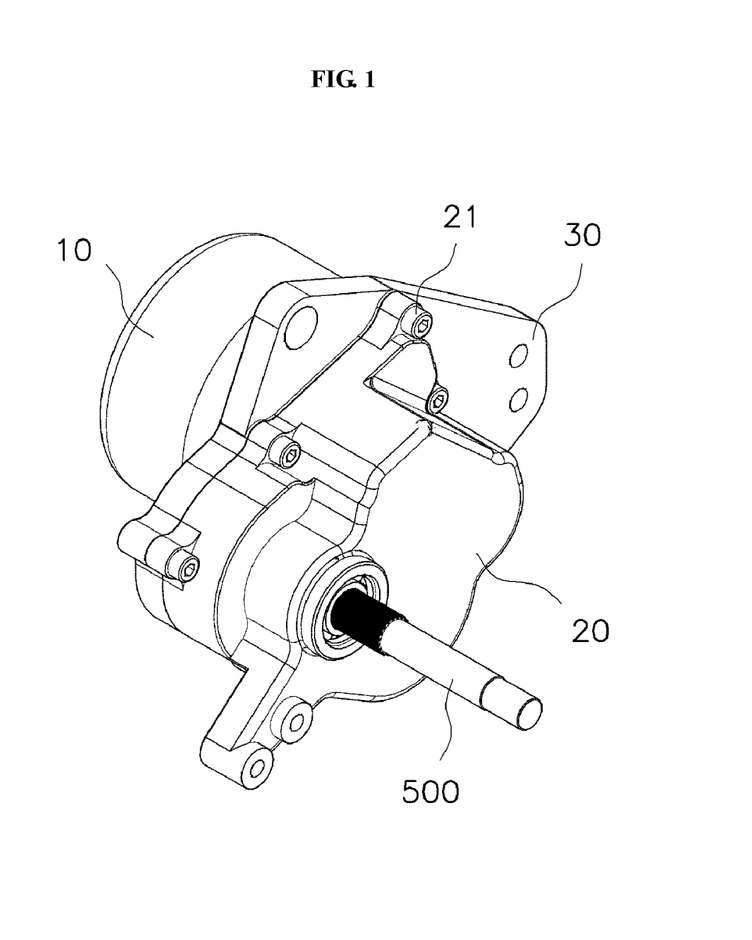
FIG. 1 is a front perspective view showing a transmission for a motor according to the present invention.
Figure 2:
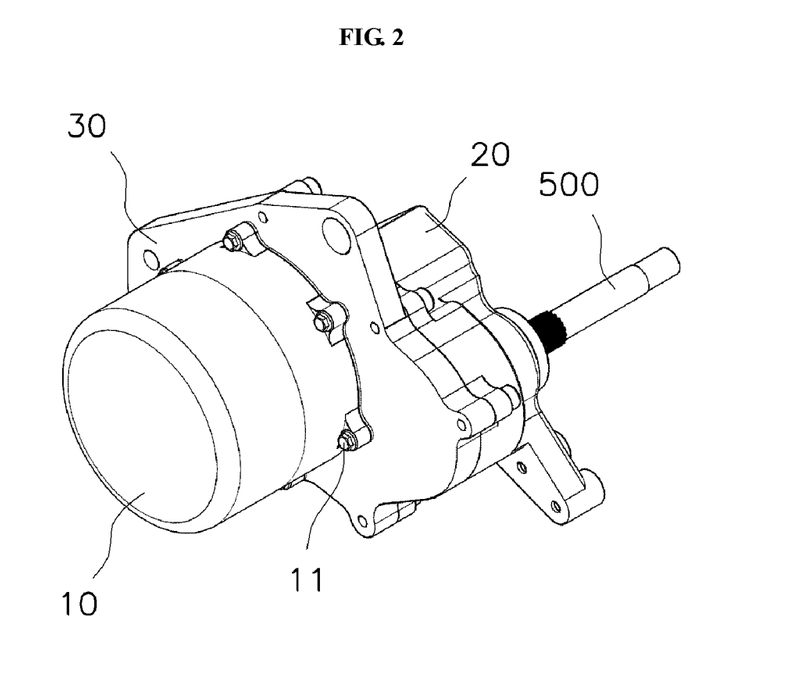
FIG. 2 is a rear perspective view showing the transmission for the motor according to the present invention.

FIG. 1 is a front perspective view showing a transmission for a motor according to the present invention, and FIG. 2 is a rear perspective view showing the transmission for the motor according to the present invention.

Figure 3:
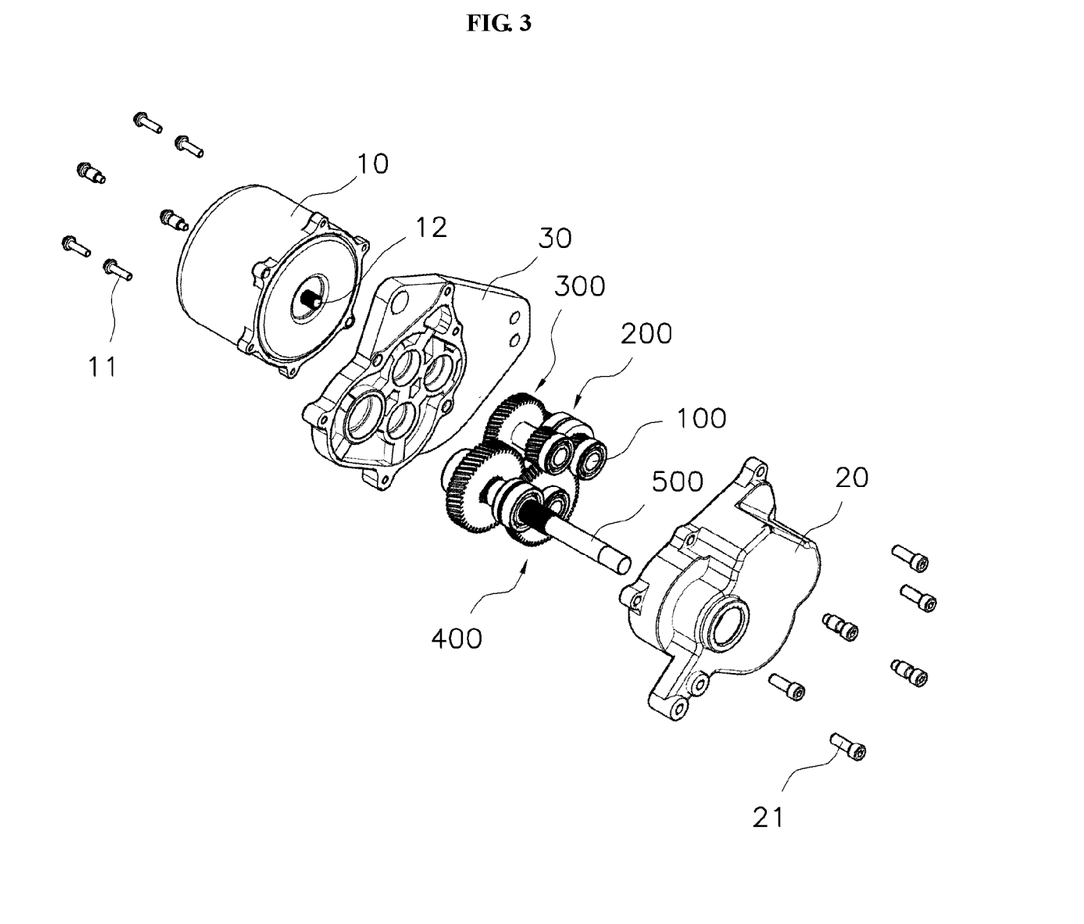
FIG. 3 is a front exploded perspective view of the transmission for the motor according to the present invention, in a state where the motor and a cover are disassembled.
Figure 4:
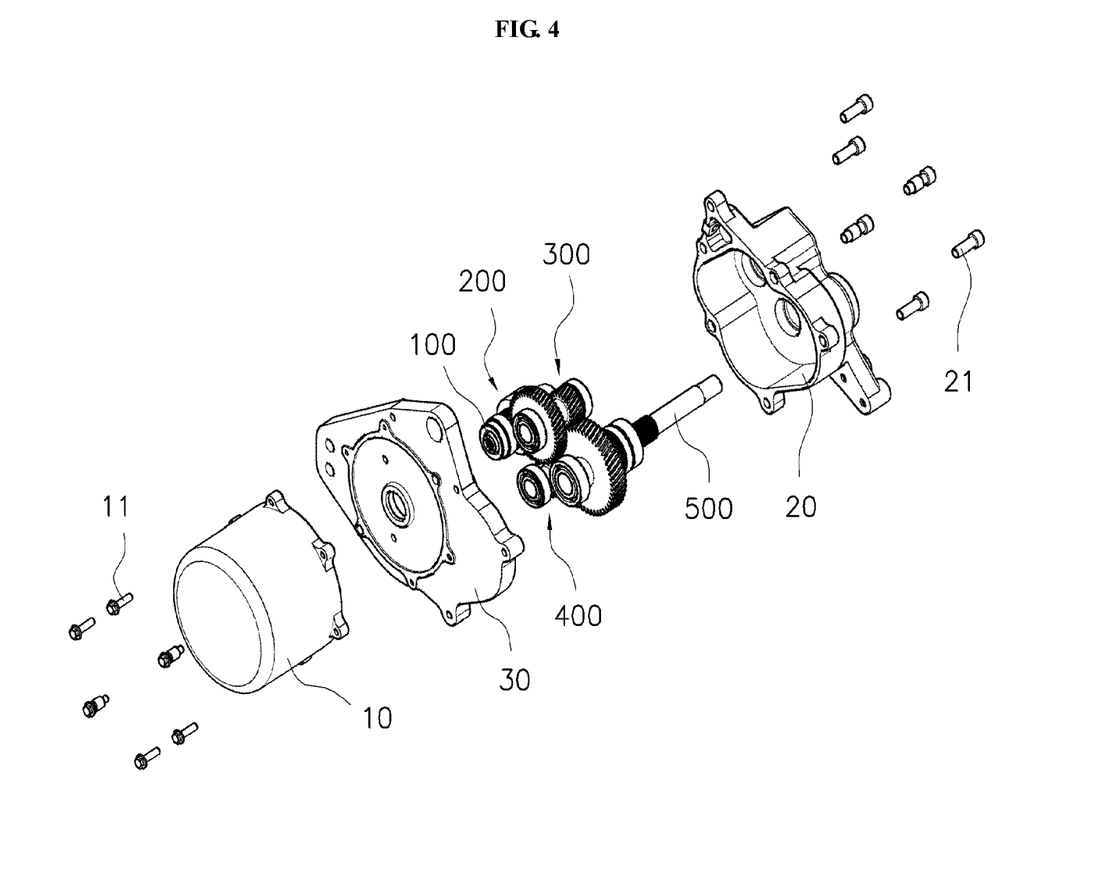
FIG. 4 is a rear exploded perspective view of the transmission for the motor according to the present invention, in the state where the motor and the cover are disassembled.
Figure 5:
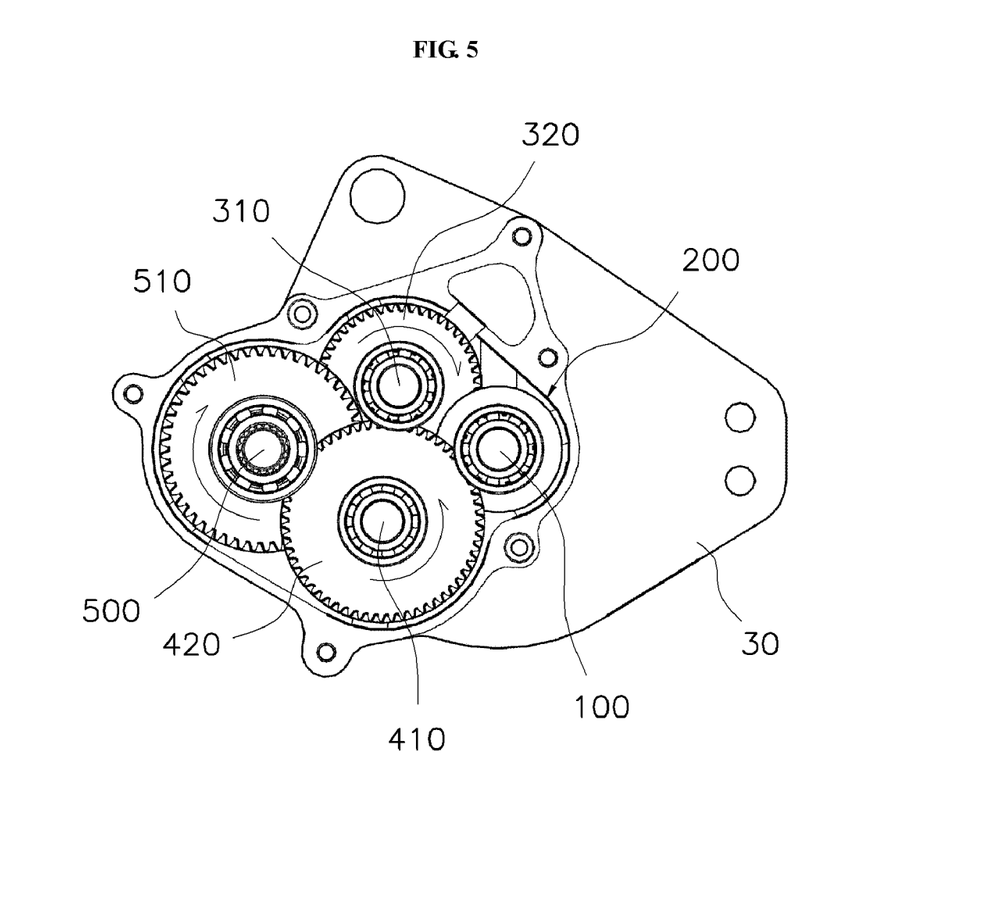
FIG. 5 is a front view of the transmission for the motor according to the present invention, in a state where the cover is removed.

Further, FIG. 3 is a front exploded perspective view of the transmission for the motor according to the present invention, in a state where the motor and a cover are disassembled; FIG. 4 is a rear exploded perspective view of the transmission for the motor according to the present invention, in the state where the motor and the cover are disassembled; and FIG. 5 is a front view of the transmission for the motor according to the present invention, in a state where the cover is removed.

Figure 6:
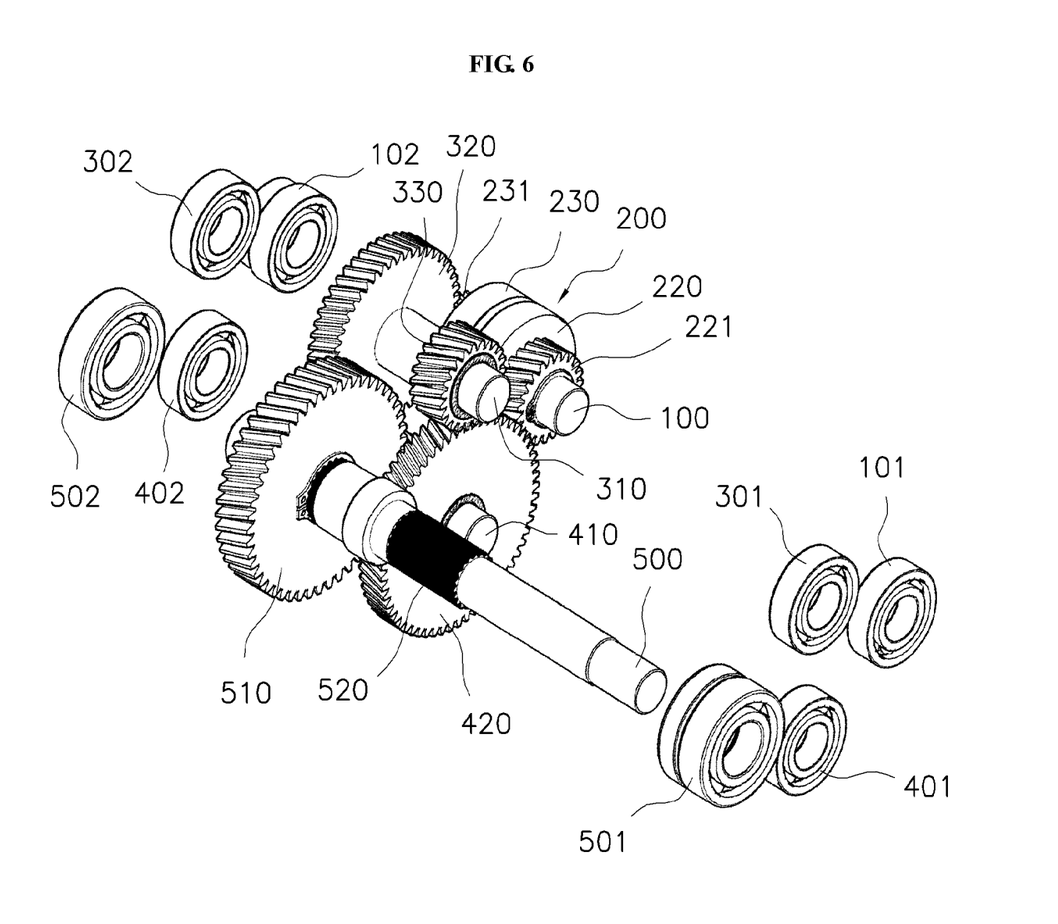
FIG. 6 is a front exploded perspective view of the transmission for the motor according to the present invention, in a state where bearings are disassembled.
Figure 7:
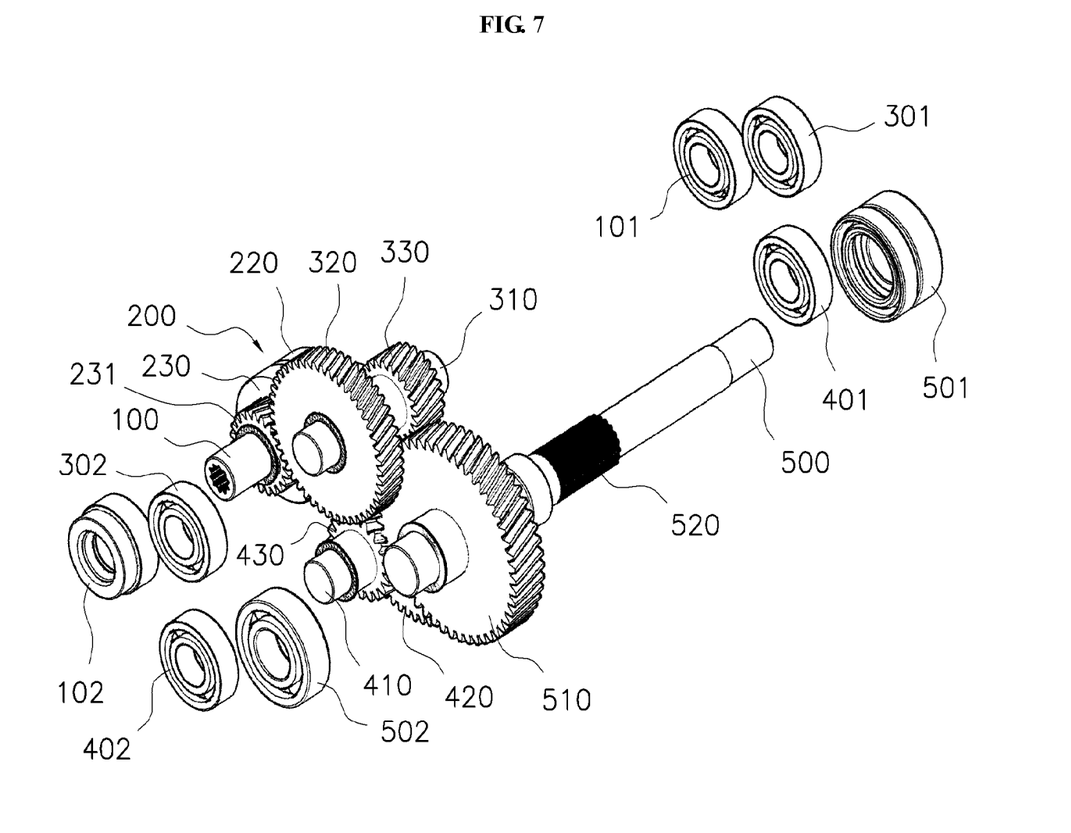
FIG. 7 is a rear exploded perspective view of the transmission for the motor according to the present invention, in the state where the bearings are disassembled.

Moreover, FIG. 6 is a front exploded perspective view of the transmission for the motor according to the present invention, in a state where bearings are disassembled; and FIG. 7 is a rear exploded perspective view of the transmission for the motor according to the present invention, in the state where the bearings are disassembled.

Figure 8:
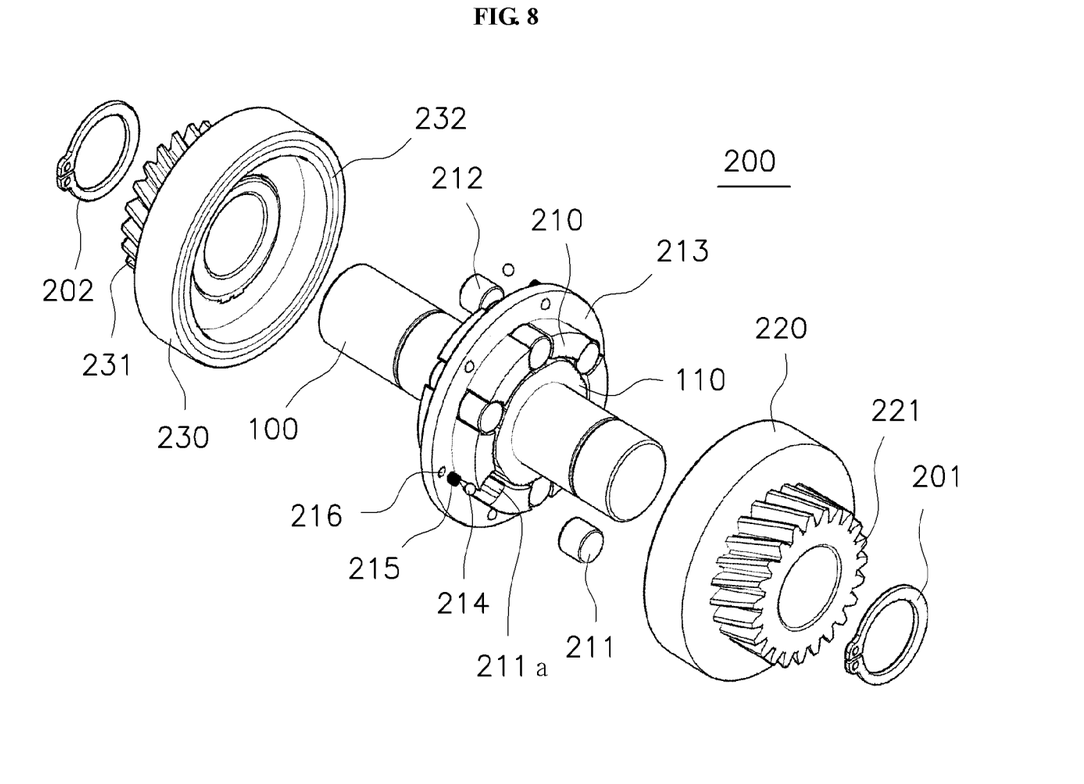
FIG. 8 is a front exploded perspective view of a dual one-way clutch in the transmission for the motor according to the present invention.
Figure 9:
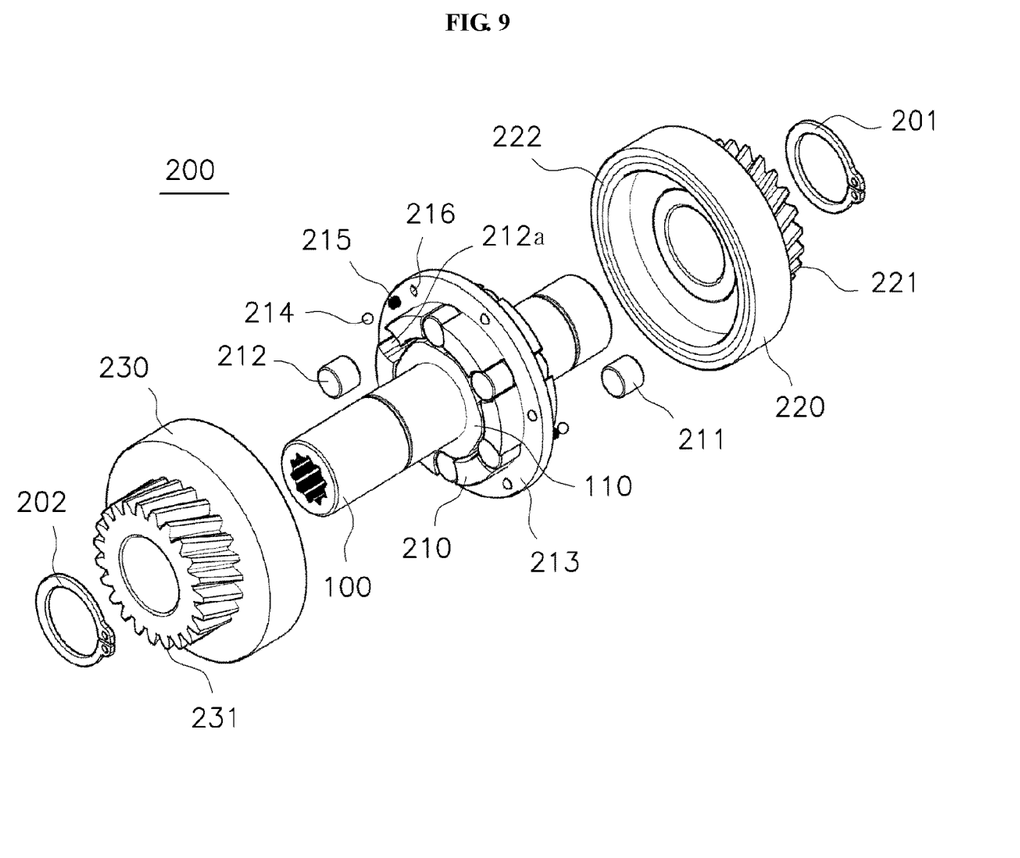
FIG. 9 is a rear exploded perspective view of the dual one-way clutch in the transmission for the motor according to the present invention.

Next, FIG. 8 is a front exploded perspective view of a dual one-way clutch in the transmission for the motor according to the present invention; and FIG. 9 is a rear exploded perspective view of the dual one-way clutch in the transmission for the motor according to the present invention.

Figure 10:
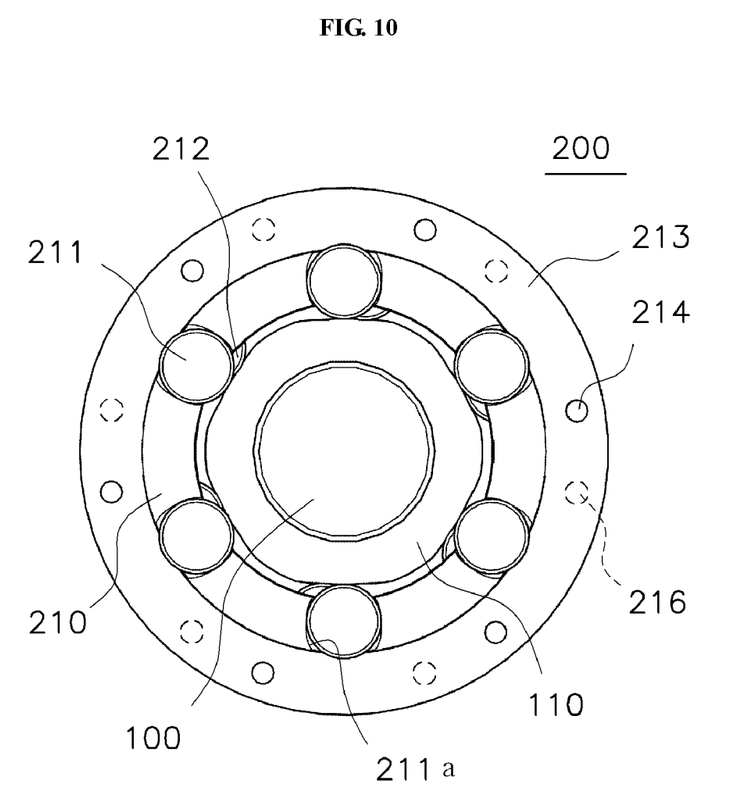
FIG. 10 is a front view of the dual one-way clutch in the transmission for the motor according to the present invention.
Figure 11:
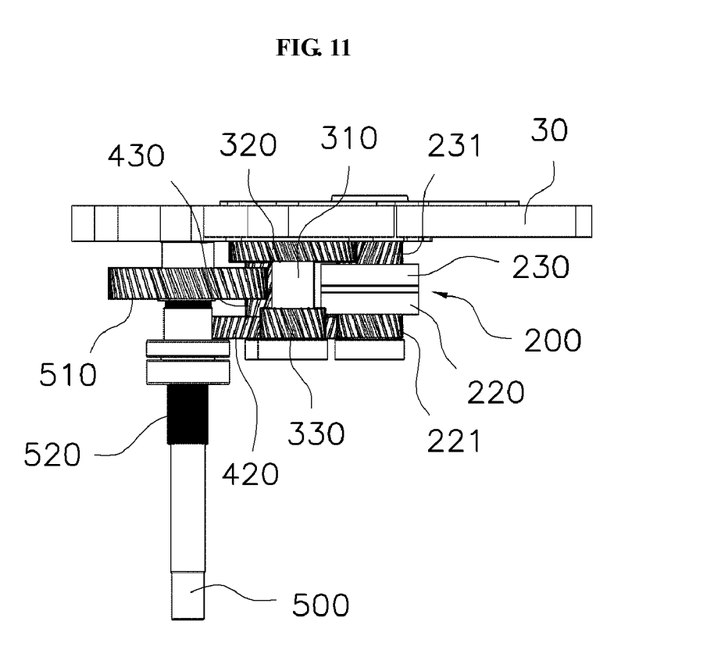
FIG. 11 is a plan view of the transmission for the motor according to the present invention, in the state where the motor and the cover are removed.

Finally, FIG. 10 is a front view of the dual one-way clutch in the transmission for the motor according to the present invention; and FIG. 11 is a plan view of the transmission for the motor according to the present invention, in the state where the motor and the cover are removed.

As shown in FIGS. 1 to 11, the transmission for the motor according to the present invention is basically characterized in that despite of a simple structure, an output shaft 500 is rotated only in one direction at different shifting ratios according to forward/reverse driving of a rotational shaft 12 of the motor 10 while enabling a reverse input, a malfunction caused by slippage is prevented in advance, and durability is improved to enable the transmission to be used for a long period of time.

An embodiment of the present invention will be described in detail below with reference to the accompanying drawings.

As shown in FIGS. 1 to 4, the transmission for the motor according to the present invention receives a rotational force from a rotational shaft 12 of a motor 10 to perform an output to an output shaft 500 through shifting, and outputs the rotational force only in one direction at different shifting ratios according to forward/reverse rotation directions of the rotational shaft 12 of the motor 10. The transmission includes a driving shaft 100 having one or more one-way clutch contact surfaces 110 formed on an outer periphery of a certain region of the driving shaft; a dual one-way clutch 200 including a carrier 210 for accommodating forward restrictors 211 and reverse restrictors 212 in both faces of the carrier, respectively, wherein the forward and reverse restrictors are radially equidistantly arranged with a predetermined phase angle difference, and a forward output ring 220 and a reverse output ring 230 disposed outside the forward restrictors 211 and the reverse restrictors 212, respectively, to be selectively rotated according to a rotation direction of the driving shaft 100; and a low-speed rotational force transmitting means 300 and a high-speed rotational force transmitting means 400 including a plurality of gears engaged with one another, wherein the low-speed rotational force transmitting means and the high-speed rotational force transmitting means receive the rotational force independently from the forward output ring 220 and the reverse output ring 230 of the dual one-way clutch 200 so as to rotate the output shaft 500 with the shifting ratios though different paths, whereby the dual one-way clutch 200 preferably allows a reverse input in a direction opposite to a rotation direction of an output of the output shaft 500.

If the rotational shaft 12 of the motor 10 is rotated in the forward direction, the output shaft 500 is rotated at a predetermined shifting ratio in the transmission for the motor according to the present invention; and if the rotational shaft 12 of the motor 10 is rotated in the reverse direction which is opposite to the forward direction, the output shaft 500 is rotated at a different shifting ratio. Accordingly, two-range shifting of high speed and low speed is determined only by the rotation direction of the rotational shaft 12 of the motor 10.

The transmission for the motor according to the present invention is roughly composed of the driving shaft 100, the dual one-way clutch 200, the low-speed rotational force transmitting means 300, the high-speed rotational force transmitting means 400, and the output shaft 500.

In particular, the transmission for the motor according to the present invention is optimized for a two-wheel vehicle such as a bicycle, a scooter or a motorcycle which can employ a motor as a driving source, but is not limited thereto.

In order to apply the transmission for the motor according to the present invention to an actual vehicle, the motor 10, a cover 20, a frame 30 and the like may be involved as illustrated in FIGS. 1 and 2.

The motor 10 rotates the rotational shaft 12 in response to supply of power. The rotation direction of the rotational shaft 12 of the motor 10 can be switched to the forward direction or the reverse direction according to a user's manipulation.

The rotational force from the rotational shaft 12 of the above motor 10 is transmitted to the driving shaft 100 of the transmission for the motor according to the present invention.

The cover 20 protects the transmission for the motor according to the present invention against an external shock, while preventing the transmission from being exposed to an outside and blocking entrance of foreign substances. The cover is secured to the frame 30 by means of a plurality of fastening means 21.

The frame 30 functions as a framework for the transmission for the motor according to the present invention and may be formed integrally with a framework of the two-wheel vehicle described above. In view of assemblability and the like, however, it is preferable to separately form the frame 30 and then to secure the frame 30 to the vehicle.

A plurality of fastening holes may be formed in this frame 30 so that the fastening holes may be used, for example, to secure the frame 30 to a vehicle body or to couple or install a shock absorbing device or a braking device to the frame 30.

Regarding FIGS. 1 to 4, the aforementioned motor 10 is secured to a left side of the frame 30, when viewed in the figures, by a plurality of fastening means 11; and the cover 20 in which the transmission for the motor of the present invention has been housed is assembled to a right side of the frame 30, when viewed in the figures.

In the present invention, the driving shaft 100 receives the rotational force from the rotational shaft 12 of the motor 10 and is rotated in the forward or reverse direction. The rotational shaft 12 of the motor 10 may extend to be also used as the driving shaft 100. In view of compatibility or assemblability, however, the present invention is illustrated as an embodiment in which the rotational shaft 12 of the motor 10 passes through the frame 30 and is then inserted into a left side of the driving shaft 100, when viewed in the figures, so as to be engaged with an inner gear.

In FIGS. 6 and 7, the driving shaft 100 is rotatably supported by the cover 20 via a right bearing 101 and by the frame 30 via a left bearing 102.

Particularly, one or more one-way clutch contact surfaces 110 are formed on an outer periphery of a certain portion of the driving shaft 100. FIG. 10 illustrates that six (6) one-way clutch contact surfaces 110 are formed. It is preferable that one-way clutch contact surfaces 110 are formed such that corners of the one-way clutch contact surfaces 110 are connected to each other with gentle curves at radially equal intervals.

The dual one-way clutch 200 is located outside the one-way clutch contact surfaces 110 of the driving shaft 100.

In the present invention, as shown in FIGS. 8 to 10, the dual one-way clutch 200 is composed of the carrier 210 for rotatably accommodating the forward restrictors 211 and the reverse restrictors 212, the forward output ring 220, and the reverse output ring 230.

The carrier 210 is a ring-shaped member in which reception recesses 211a on a front face of the carrier 210 shown in FIG. 8 and reception recesses 212a on a rear face of the carrier 210 shown in FIG. 9 are formed to be asymmetric with respect to each other. Here, the forward restrictors 211 are placed in the reception recesses 211a on the front face and the reverse restrictors 212 are placed in the reception recesses 212a on the rear face, respectively.

The forward restrictors 211 and the reverse restrictors 212 have the same shape and size, and they are classified into the forward restrictors 211 and the reverse restrictors 212 only depending on their functions.

The forward restrictors 211 and the reverse restrictors 212 may be in the form of a generally cylindrical roller and may also have a complete spherical shape.

The reception recesses 211a and 212a formed on the carrier 210 are provided for accommodating the forward restrictors 211 and the reverse restrictors 212, respectively, and are configured to limit circumferential movements of the restrictors 211 and 212 accommodated in the reception recesses 211a and 212a and to guide the restrictors 211 and 212 so as to allow only radial movements of the restrictors 211 and 212 in a state where there is no rotation of the carrier 210.

The reception recesses 211a formed on the front face of the carrier 210 and the reception recesses 212a formed on the rear face have the same shape and size, although in view of formed positions of the reception recesses 211a and 212a, they are arranged with a predetermined phase angle difference as shown in FIG. 10.

Such a phase angle difference is determined such that one forward restrictor 211 and one reverse restrictor 212 are located between corners of one one-way clutch contact surface 110 of the driving shaft 100 disposed in the carrier 210. Accordingly, the plurality of reception recesses 211a and 212a are formed on one carrier 210, and the forward restrictors 211 or the reverse restrictors 212 are placed in the respective reception recesses 211a and 212a.

Although FIG. 10 illustrates the configuration in which six (6) forward restrictors 211 and six (6) reverse restrictors 212 are used by employing the driving shaft 100 formed with six (6) one-way clutch contact surfaces 110, it will be apparent that the number of the restrictors 211 and 212 may be properly increased or decreased.

In addition, the forward output ring 220 and the reverse output ring 230 are provided on the front face and the rear surface of the carrier 210, respectively.

Thus, the one-way clutch contact surfaces 110 of the driving shaft 100 are located inside the forward restrictors 211 and the reverse restrictors 212 of the carrier 210, and the forward output ring 220 and the reverse output ring 230 are placed on the front and rear faces of the carrier 210, respectively, and outside the restrictors 211 and restrictors 212.

Accordingly, when the driving shaft 100 is rotated in the forward direction, i.e., in a clockwise direction in FIG. 10, the forward restrictors 211 are confined between the one-way clutch contact surfaces 110 and the forward output ring 220 so as to transmit the rotational force in the clockwise direction, while the reverse restrictors 212 are located at positions where the reverse restrictors 212 are not confined so that no rotational force is transmitted to the reverse output ring 230.

On the contrary, when the driving shaft 100 is rotated in the reverse direction, i.e., in a counter-clockwise direction in FIG. 10, the reverse restrictors 212 are confined between the one-way clutch contact surfaces 110 and the reverse output ring 230 so as to transmit the rotational force in the counter-clockwise direction, while the forward restrictors 211 are located at positions where the forward restrictors 211 are not confined so that no rotational force is transmitted to the forward output ring 220.

As a result, the dual one-way clutch 200 rotates only the forward output ring 220 in the forward direction when the driving shaft 100 is rotated in the forward direction, and rotates only the reverse output ring 230 in the reverse direction when the driving shaft 100 is rotated in the reverse direction.

In FIGS. 8 and 9, reference numerals 221 and 231 indicate gears formed integrally with the forward output ring 220 and the reverse output ring 230, respectively. The output from the dual-one way clutch 200 will be obtained via the gears 221 and 231.

Furthermore, reference numerals 201 and 202 indicate snap rings fastened to prevent the dual one-way clutch 200 from being separated from the driving shaft 100 after the dual one-way clutch 200 has been assembled to the driving shaft 100.

Finally, the low-speed rotational force transmitting means 300 and the high-speed rotational force transmitting means 400 independently receive the rotational force from the forward output ring 220 and the reverse output ring 230 of the dual one-way clutch 200 so as to rotate the output shaft 500 at shifting ratios established along different paths, and are comprised of a plurality of gears rotatably engaged with each other.

There is no limitation on the arrangement and kinds of such gears, and it is also possible to independently implement the low-speed rotational force transmitting means 300 and the high-speed rotational force transmitting means 400 such that they do not share each other. As shown in the figures, the low-speed rotational force transmitting means 300 and the high-speed rotational force transmitting means 400 may share some configurations to perform the output.

In the present invention, as illustrated in FIGS. 3 to 7, the low-speed rotational force transmitting means 300 and the high-speed rotational force transmitting means 400 may be implemented with a first shaft 310 on which a first large gear 320 and a first small gear 330 are provided, a second shaft 410 on which a second large gear 420 and a second small gear 430 are provided, and a gear 510 provided on the output shaft 500.

The first shaft 310 is rotatably supported by the cover 20 via a bearing 301 provided on the right side in the figures and by the frame 30 via a bearing 302 provided on the left side in the figures.

The first large gear 320 and the first small gear 330 are provided integrally with the first shaft 310, wherein the first large gear 320 is engaged with the gear 231 of the aforementioned reverse output ring 230 and the first small gear 330 is engaged with the second large gear 420 to be described later.

Moreover, the second shaft 410 is also rotatably supported by the cover 20 via a bearing 401 provided on the right side in the figures and by the frame 30 via a bearing 402 provided on the left side in the figures.

The second large gear 420 and the second small gear 430 are provided integrally with the second shaft 410, wherein the second large gear 420 is simultaneously engaged with the gear 221 of the aforementioned forward output ring 220 and the first small gear 330 and the second small gear 430 is engaged with a gear 510 provided on the output shaft 500.

With this configuration, the low-speed rotational force transmitting means 300 is composed of the reverse output ring 230 of the dual one-way clutch 200→the first large gear 320→the first small gear 330→the second large gear 420→the second small gear 430→the output shaft 500.

The high-speed rotational force transmitting means 400 is composed of the forward output ring 220 of the dual one-way clutch 200→the second large gear 420→the second small gear 430→the output shaft 500.

In other words, the low-speed rotational force transmitting means 300 performs shifting with a gear ratio via the first large gear 320 and the first small gear 330, so that low-speed shifting is performed when the reverse output is produced from the rotational shaft 12 of the motor 10, and the high-speed rotational force transmitting means 400 performs high-speed shifting without undergoing such low-speed shifting when the forward output is produced from the rotational shaft 12 of the motor 10.

Of course, the present invention is not limited thereto, and it is possible to obtain appropriate shifting ratios for two ranges as required.

As for the rotation direction, when the driving shaft 100 is rotated in the forward direction (in the clockwise direction in FIGS. 5 and 10), the rotational force does not pass through the first large gear 320 and the first small gear 330, so that the output shaft 500 performs an output while being rotated in the same direction (in the clockwise direction in FIG. 5). When the driving shaft 100 is rotated in the reverse direction (in the counter-clockwise direction in FIGS. 5 and 10), the rotational force passes through the first large gear 320 and the first small gear 330 and thus the rotation direction is reversed, so that the output shaft 500 perform an output while being rotated in the opposite direction (in the clockwise direction in FIG. 5).

The forgoing illustrates the configuration in which the first shaft 310 and the second shaft 410 are included to allow the output shaft 500 always outputs the rotational force in the clockwise direction in FIG. 5 irrespective of the forward rotation (in the clockwise direction in FIGS. 5 and 10) or the reverse rotation (in the counter-clockwise direction in FIGS. 5 and 10) of the rotational shaft 12 of the motor 10. For example, however, if the second shaft 410 is set as an output shaft, this output shaft may always output the rotational force in the counter-clockwise direction in FIG. 5 irrespective of the forward rotation (in the clockwise direction in FIGS. 5 and 10) or the reverse rotation (in the counter-clockwise direction in FIGS. 5 and 10) of the rotational shaft 12 of the motor 10.

Herein, reference numerals 501 and 502 indicate the bearings for allowing the output shaft 500 to be rotatably supported by the cover 20 and the frame 30. It is possible to form a separate outer gear 520 at an intermediate portion of the output shaft 500 to enable the output to be transmitted to wheels of a vehicle through the outer gear 520.

As a result, the present invention can output the rotational force in one direction at different shifting ratios according to the forward rotation or the reverse rotation of the rotational shaft 12 of the motor 10.

In the embodiment of the present invention described above, the output shaft 500 is directly coupled to the plurality of gears constructing the low-speed rotational force transmitting means 300 and the high-speed rotational force transmitting means 400, so that the plurality of gears are rotated together with one another in response to the rotation of the output shaft 500.

Therefore, for example, when a user directly pulls an electric bicycle equipped with the transmission for the motor of the present invention so as to move the bicycle in a backward direction, a force in a direction (counter-clockwise direction in FIG. 5) opposite to a rotation direction (clockwise direction in FIG. 5) of the output shaft 500 for a forward movement of the bicycle may be reversely input to the output shaft 500.

However, the transmission for the motor according to the present invention has a great advantage in that even if a rotational force in a direction opposite to the rotation direction of the output shaft 500 is reversely input through the plurality of gears constructing the low-speed rotational force transmitting means 300 and the high-speed rotational force transmitting means 400, the dual one-way clutch 200 can allow input of such a rotational force in the opposite direction, so that damage to the transmission caused by the reverse input may be prevented in advance.

Additionally, in the transmission for the motor according to the present invention described above, if the carrier 210 is rotated together with the driving shaft 100 when the driving shaft 100 is rotated in the forward direction or the reverse direction, there is concern that the forward restrictors 211 and the reverse restrictors 212 may not be confined between the one-way clutch contact surfaces 110 of the driving shaft 100 and the forward output ring 220 or the reverse output ring 230, and in this case, the rotational force may not be appropriately output.

Therefore, in order to prevent the occurrence of this phenomenon, the present invention is preferably configured such that as shown in FIGS. 8 and 9, the carrier 210 of the dual one-way clutch 200 is formed with a flange-shaped extension 213 between the forward output ring 220 and the reverse output ring 230, elastic bodies 215 for elastically supporting balls 214 toward the forward output ring 220 and the reverse output ring 230 are accommodated in the extension 213, and grooves 222 and 232 are formed on the forward output ring 220 and the reverse output ring 230, respectively, wherein each of the grooves 222 and 232 corresponds to the ball 214 and extends along an outer periphery of the corresponding output ring 220 and 230.

The figures illustrates that a total of twelve (12) holes 216 are formed in front and rear surfaces of the extension 213 of the carrier 210. Six (6) holes 216 are equidistantly formed on a side at which the forward output is performed and six (6) holes 216 are equidistantly formed on a side at which the reverse output is performed, wherein the six (6) holes 216 formed on one of the sides are arranged with a phase angle difference of 60 degrees with respect to those formed on the other side.

Furthermore, the grooves 222 and 232 are formed along the outer peripheries of the forward output ring 220 and the reverse output ring 230, respectively, and have a size corresponding to that of each of the balls 214.

Particularly, since the plurality of balls 214 provided in the extension 213 of the carrier 210 are guided within the grooves 222 and 232 of the forward output ring 220 and the reverse output ring 230, the balls 214 help more stable rotation of the carrier 210.

Accordingly, the balls 214 are elastically supported within the respective holes 216 by the elastic bodies 215, so that the balls 214 are maintained in contact with the forward output ring 220 or the reverse output ring 230. As a result, the balls 214 inhibit the carrier 210 from being rotated together with the driving shaft 100, so that a malfunction such as slippage that may occur as the carrier 210 is rotated together with the driving shaft 100 may be prevented in advance.

Furthermore, in the present invention, it will be most preferable that as illustrated in FIG. 11, the low-speed rotational force transmitting means 300 and the high-speed rotational force transmitting means 400 including a plurality of gear trains consist of helical gears arranged in opposite directions with respect to the dual one-way clutch 200, so that the helical gears are rotated while receiving symmetrical forces when the rotational forces are transmitted thereto.

This cancels out eccentricity occurred on the helical gears when the forward output is performed and eccentricity occurred on the helical gears when the reverse output is performed, so that damage to the transmission due to accumulation of lateral forces acting on the shaft may be prevented in advance even when the transmission is used for a long period of time.

Hereinafter, an operation of the transmission according to the present invention will be described with reference to FIGS. 1 to 11.

In the transmission for the motor configured as described above, when the rotational shaft 12 of the motor 10 is rotated in the forward direction, the forward restrictors 211 are confined between the one-way clutch contact surfaces 110 of the driving shaft 100 and the forward output ring 220 in the dual one-way clutch 200.

At this time, the reverse restrictors 212 are not confined due to the phase angle difference that is maintained by the carrier 210.

Therefore, shifting is performed with a gear ratio while the rotational force is transmitted from the gear 221 formed on the forward output ring 220, through the high-speed rotational force transmitting means 400 composed of the plurality of gear trains, and the output shaft 500 is then rotated at a high speed.

When the rotational shaft 12 of the motor 10 is rotated in the reverse direction, the reverse restrictors 212 are confined between the one-way clutch contact surfaces 110 of the driving shaft 100 and the reverse output ring 230 in the dual one-way clutch 200.

At this time, the forward restrictors 211 are not confined due to the phase angle difference maintained by the carrier 210.

Accordingly, shifting is performed with a gear ratio while the rotational force is transmitted from the gear 231 formed on the reverse output ring 230, through the low-speed rotational force transmitting means 300 composed of the plurality of gear trains, and the output shaft 500 is then rotated at a low speed.

Moreover, in the dual one-way clutch 200, the balls 214 further provided in the extension 213 are in elastic contact with the forward output ring 220 and the reverse output ring 230, respectively, so that the carrier 210 may be prevented from being rotated together with the driving shaft 100, thereby preventing a malfunction of the transmission.

Particularly, the plurality of gears constructing the low-speed rotational force transmitting means 300 and the high-speed rotational force transmitting means 400 are implemented by the helical gears arranged symmetrically with one another, it is also possible to prevent damage to the transmission caused by eccentric loads when the transmission is used for a long period of time.

Therefore, the transmission for the motor according to the present invention has great advantages in that a rotational force can be output only in one direction at different shifting ratios according to the forward/reverse rotation directions of the rotational shaft 12 of the motor 10 while enabling a reverse input and accurate transmission of a rotational force can be achieved without any slippage in the dual one-way clutch 200.

Additionally, the transmission for the motor according to the present invention has an advantage in that the symmetrically arranged helical gears are employed for the plurality of gear trains provided in the transmission, thereby preventing damage to the transmission due to eccentric loads even upon use thereof for a long period of time and thus increasing durability.

The embodiment is merely an example for more specifically describing the technical spirit of the present invention, and the scope of the present invention is not limited to the embodiment or figures.

DESCRIPTION OF REFERENCE NUMERALS

| | |
|---|---|
| 10: Motor | 11: Fastening means |
| 12: Rotational shaft | 20: Cover |
| 21: Fastening means | 30: Frame |
| 100: Driving shaft | 101, 102: Bearing |
| 110: One-way clutch contact surface | 200: Dual one-way clutch |
| 201, 202: Snap ring | 210: Carrier |
| 211: Forward restrictor | 211a: Reception recess |
| 212: Reverse restrictor | 212a: Reception recess |
| 213: Extension | 214: Ball |
| 215: Elastic body | 216: Hole |
| 220: Forward output ring | 221: Gear |
| 222: Groove | 230: Reverse output ring |
| 231: Gear | 232: Groove |
| 300: Low-speed rotational force transmitting means | |
| 301, 302: Bearing | 310: First shaft |
| 320: First large gear | 330: First small gear |
| 400: High-speed rotational force transmitting means | |
| 401, 402: Bearing | 410: Second shaft |
| 420: Second large gear | 430: Second small gear |
| 500: Output shaft | 501, 502: Bearing |
| 510: Gear | 520: Outer gear |

The invention claimed is:

1. A transmission for a motor, the transmission receiving a rotational force from a rotational shaft of a motor to perform an output to an output shaft through shifting, and outputting the rotational force only in one direction at different shifting ratios according to forward/reverse rotation directions of the rotational shaft of the motor, the transmission comprising:

a driving shaft having one or more one-way clutch contact surfaces formed on an outer periphery of a certain region of the driving shaft;

a dual one-way clutch including a carrier for accommodating forward restrictors and reverse restrictors in both faces of the carrier, respectively, the forward and reverse restrictors being radially equidistantly arranged with a predetermined phase angle difference, and a forward output ring and a reverse output ring disposed outside the forward restrictors and the reverse restrictors, respectively, to be selectively rotated according to a rotation direction of the driving shaft; and a low-speed rotational force transmitting means and a high-speed rotational force transmitting means including a plurality of gears engaged with one another, the low-speed rotational force transmitting means and the high-speed rotational force transmitting means receiving the rotational force independently from the forward output ring and the reverse output ring of the dual one-way clutch so as to rotate the output shaft with the shilling ratios though different paths, whereby the dual one-way clutch allows a reverse input in a direction opposite to a rotation direction of an output of the output shaft, and wherein the carrier of the dual one-way clutch has a flange-shaped extension formed between the forward output ring and the reverse output ring, elastic bodies for elastically supporting balls toward the forward output ring and the reverse output ring are accommodated in the extension, and grooves are formed on the forward output ring and the reverse output ring, respectively, wherein each of the grooves corresponds to the ball and extends along an outer periphery of the corresponding output ring.

2. The transmission for a motor according to claim 1, wherein the low-speed rotational force transmitting means and the high-speed rotational force transmitting means include a plurality of gear trains consist of helical gears arranged in opposite directions with respect to the dual one-way clutch, so that the helical gears are rotated while receiving symmetrical forces when the rotational forces are transmitted thereto.

* * * * *